US006694250B2

(12) United States Patent
Todoriki (10) Patent No.: US 6,694,250 B2
(45) Date of Patent: Feb. 17, 2004

(54) INFORMATION PROVIDING SYSTEM AND METHOD (75) Inventor: Tsuyoshi Todoriki, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/983,375

(22) Filed: Oct. 24, 2001

(65) Prior Publication Data

US 2002/0052686 A1 May 2, 2002

(30) Foreign Application Priority Data

Nov. 1, 2000 (JP) .................................... P2000-334994

(51) Int. Cl.$^7$ .............................................. G08G 1/123
(52) U.S. Cl. ...................... 701/200; 340/988; 340/425.5
(58) Field of Search ................................. 701/200, 207, 701/208, 24, 25, 210, 50; 340/989, 988, 992, 991, 426, 425.5

(56) References Cited

U.S. PATENT DOCUMENTS

| 5,568,390 A | | 10/1996 | Hirota et al. ............... 340/990 |
| 5,699,056 A | * | 12/1997 | Yoshida ....................... 340/905 |
| 5,938,721 A | | 8/1999 | Dussell et al. ............... 701/211 |
| 6,002,326 A | * | 12/1999 | Turner ......................... 340/426 |
| 6,028,537 A | | 2/2000 | Suman et al. ............... 340/988 |
| 6,150,928 A | * | 11/2000 | Murray ....................... 340/426 |
| 6,154,699 A | * | 11/2000 | Williams ...................... 701/50 |
| 6,166,627 A | * | 12/2000 | Reeley ......................... 340/426 |
| 6,263,276 B1 | * | 7/2001 | Yokoyama et al. ......... 701/207 |
| 6,337,641 B1 | * | 1/2002 | Yoshioka et al. ........... 340/989 |
| 2001/0037271 A1 | * | 11/2001 | Kubota ......................... 705/34 |

FOREIGN PATENT DOCUMENTS

| EP | 0 647 753 A1 | 4/1995 |
| EP | 0 771 686 A2 | 5/1995 |
| JP | 2000-121375 | 4/2000 |

* cited by examiner

Primary Examiner—Thomas G. Black
Assistant Examiner—Tuan C To
(74) Attorney, Agent, or Firm—McDermott, Will & Emery (57) ABSTRACT An information providing system of a vehicle providing information from an outside section to the vehicle is provided with: a communication section making a request to the outside section for transmitting a pre-selected service information and receiving the requested service information from the outside section through a communication network; a memory section storing the requested service information received from the outside section; an information providing section providing the received information stored in the memory section; a light emitting section located in a frontal visible area of the vehicle; and a control section controlling the information providing section and the light emitting section. The control section turns on the light emitting section for a first time interval when the requested service information is received and after that, allows the information providing section to provide the stored service information.

13 Claims, 7 Drawing Sheets

INFORMATION PROVIDING SYSTEM AND METHOD

BACKGROUND OF THE INVENTION

The present invention relates to an information providing system and a method, more particularly, to an information providing system and a method for providing information, which is received from an outside information center, to a driver of a vehicle.

In recent years, it has been proposed to utilize a navigation apparatus as an information providing system, of a vehicle, which enables a driver to request local information such as weather or traffic conditions at a destination area to an information center to receive desired information which is displayed over a display screen in a manner as disclosed in Japanese Patent Application Laid-Open Publication NO. 2000-121375.

In such a structure, it is possible for the driver to confirm displayed information for studying a route to be altered or a destination area to be altered.

SUMMARY OF THE INVENTION

However, in the structure described above, since the display screen immediately displays the contents of received information when it is received from the information center, the display of received information forcibly calls for the driver's attention in spite of driving the vehicle in any circumferential situation, with a difficulty caused in paying a careful attention to the circumferential situation.

It is therefore an object of the present invention to provide an information providing system and a method, for providing information to a driver of a vehicle, which enables a driver to confirm a circumferential situation in a frontal area of the vehicle during a traveling condition before confirming received information.

According to one aspect of the present invention, there is provided an information providing system of a vehicle providing information from an outside section to the vehicle is provided with: a communication section making a request to the outside section for transmitting a pre-selected service information and receiving the requested service information from the outside section; a memory section storing the requested service information received from the outside section; an information providing section providing the received information stored in the memory section; a light emitting section located in a frontal visible area of the vehicle; and a control section controlling the information providing section and the light emitting section. Here, the control section turns on the light emitting section for a first time interval when the requested service information is received and after that, allows the information providing section to provide the stored service information.

Besides, in the present invention, a method of providing information from an outside section to a vehicle requests a pre-selected service information to the outside section; receives the requested service information from the outside section; stores the received service information; provides the stored information in the vehicle; emits a light at a frontal visible area of the vehicle; and controls a timing at which the light is emitted and a timing at which the stored information is provided. Here, the light is emitted for a first time interval when the requested service information is received and after that, the stored service information is provided.

Other and further features, advantages, and benefits of the present invention will become more apparent from the following description taken in conjunction with the following drawings.

DETAILED DESCRIPTION OF THE PREFERRED EMBODIMENTS

To describe the present invention more in detail, several embodiments of the present invention will be explained with reference to the accompanied drawings below, with like parts bearing the same reference numerals throughout the drawings.

(First Embodiment)

Figure 1:
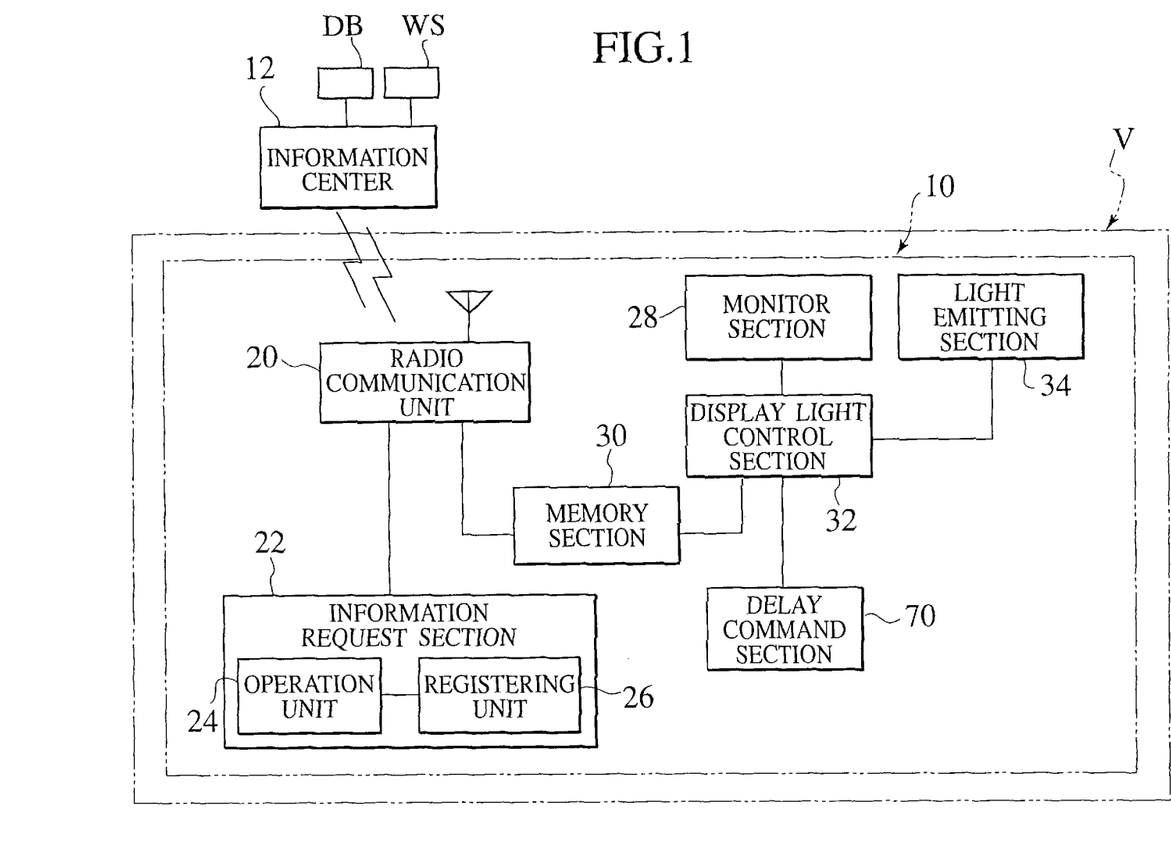
FIG. 1 is a block diagram of an information providing system of a first embodiment according to the present invention.

Referring now to FIG. 1, there is shown a block diagram of an information providing system of a first embodiment according to the present invention. The information providing system 10 is located in a vehicle V and arranged to receive service information from an information center 12 which may be connected to a database DB that stores service information, such as a weather information, a positional information, a destination area information, a traffic information, an e-mail information, and a news information, etc. Further, the information center 12 may be also connected to web sites WB. Though not shown in FIG. 1, the information center 12 includes a computer which controls the receipt of an information request issued by the information providing system 10 and the transmission of requested information to the information providing system 10. The information center 12 also includes a radio communication unit, though not shown, to transmit requested information to the information providing system 10.

The information providing system 10 includes a radio communication unit 20, which is composed of a computer (not shown) including a CPU for requesting various service information to the information center 12 according to a user's information request and receiving the requested service information transmitted from the information center 12, and a controller (not shown) for controlling the transmission of the information request and the receipt of the service information transmitted from the information center 12. To this end, the information providing system 10 also includes an information request section 22 which is constructed with an operation unit 24 enabling a driver to input an information request to request the desired service information to the information center 12, and a register unit 26 which stores therein a menu for objects to be accessed so as to access the desired service information of the database and the web sites from the information center 12.

Each selected object to be accessed is displayed in a monitor section 28 when operating the operation unit 24, thereby enabling the driver to selectively manipulate the operation unit 24 for accessing the object, i.e., the desired service information while looking at the monitor section 28.

Further, the information providing system 10 includes a memory section 30, a display light control section 32 and a light emitting section 34. Service information received at the radio communication unit 20 is stored in the memory section 30. When received service information is stored in the memory section 30, the display light control section 32 functions to turn on the light emitting section 34 and, after a given time interval, described later in detail, to allow service information to be retrieved from the memory section 30 to be displayed over the monitor section 28.

Figure 2:
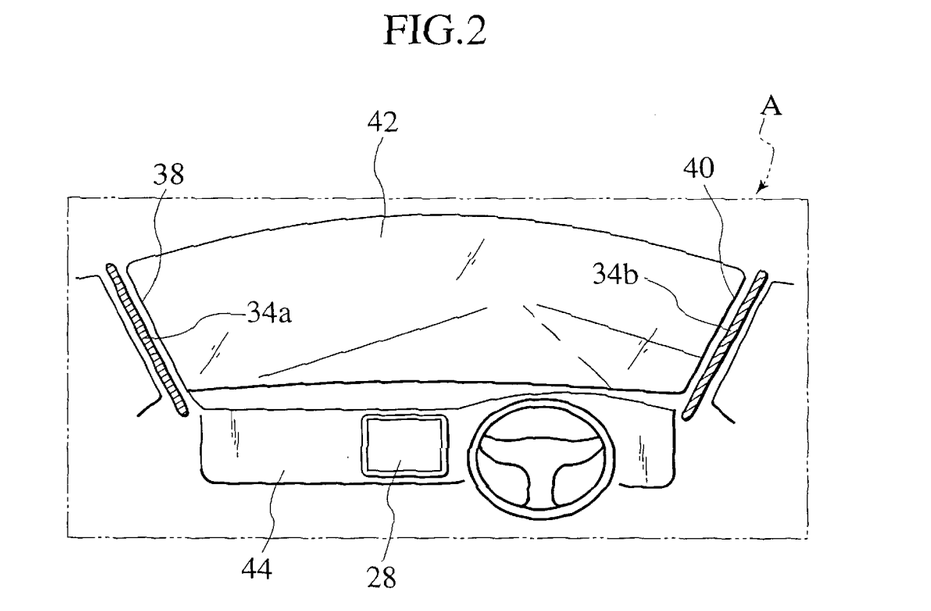
FIG. 2 is a schematic view for illustrating a layout of a light emitting section forming a part of the information providing system shown in FIG. 1.

As best seen in FIG. 2, the light emitting section 34 is composed of laterally spaced, substantially vertically extending elongated arrays of light emitting diodes (LEDs) 34a, 34b mounted on respective inner walls of left and right front pillars 38, 40 at both sides of a vehicle front window 42 in a driver's frontal visible range A. Also, the monitor section 28 is mounted to a central area of an instrument panel 44 and, in a case where a navigation system is installed in the vehicle, may be also utilized as a display monitor of the same.

Figure 3:
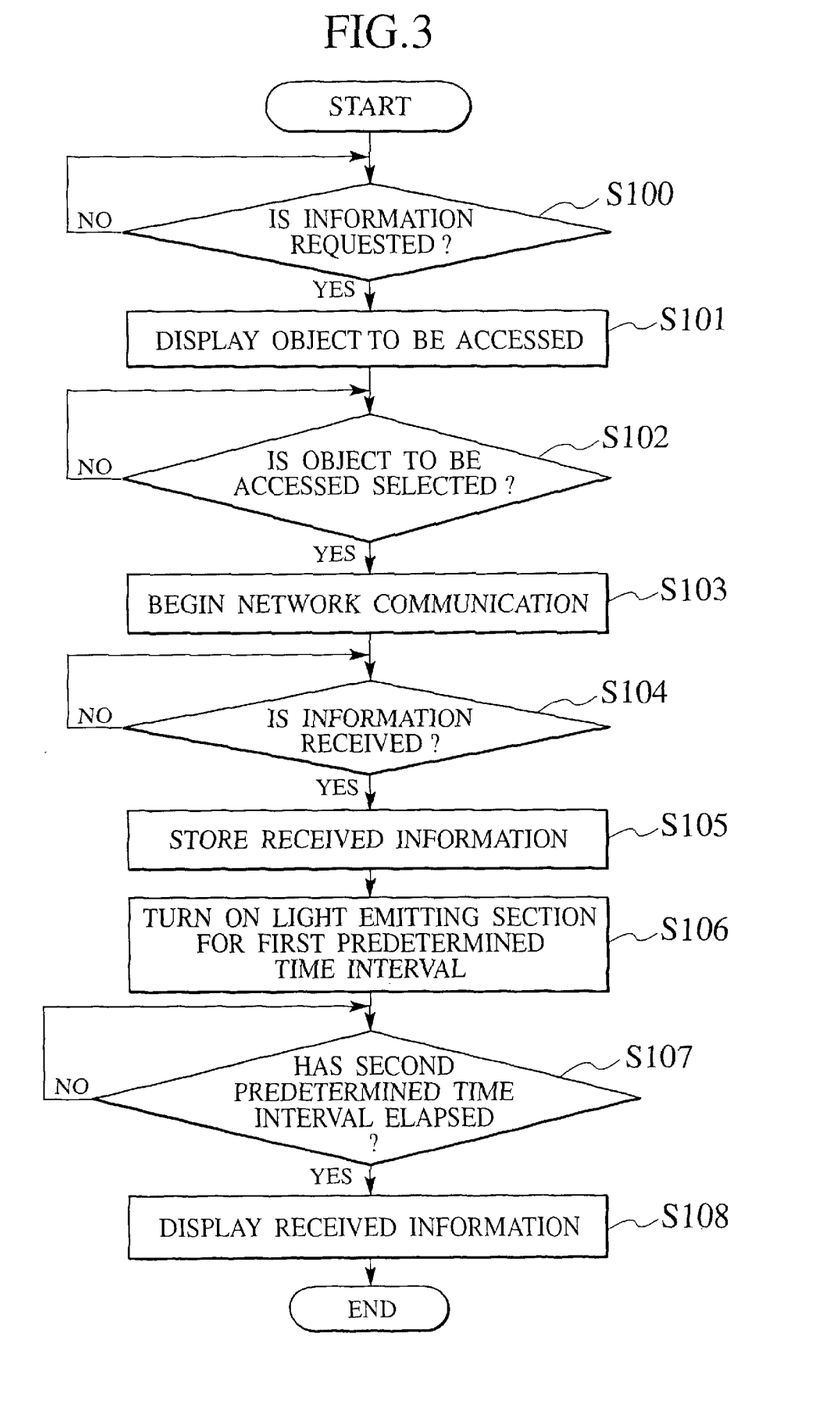
FIG. 3 is a flow diagram of a sequence of operational steps for the information providing system shown in FIG. 1 to carry out a method of the present invention.

FIG. 3 is a flow diagram of the basic sequence of operational steps to be performed in the information providing system 10 shown in FIG. 1 to carry out a method of the present invention.

At the start, a main switch (not shown) is turned on to supply electric power to the information providing system 10, which is turned on.

In step S100, the radio communication unit 20 checks whether the operation unit 24 is operated for inputting the information request or remains un-operated. Upon the driver's operation of the operation unit 24 to request service information, in step S101, the particular objects, which correspond to the database or web sites to be accessed and are registered as a particular menu in the register unit 26, are displayed over the monitor section 28.

In step S102, the radio communication unit 20 checks whether the particular service information is selected and when it is selected, the operation goes to step S103, thereby commencing the communication between the information center 12 and the radio communication unit 20 to make a request to the information center 12 for transmitting the selected service information and allow the selected service information to be transmitted to the radio communication unit 20.

As previously noted, service information involves the weather information, the positional information, the destination area information, the traffic information, the e-mail information, and the news information, etc. However, the service information may further involve a desired facility such as, for example, stations, restaurants, commercial buildings, theaters, shops, parking lots, etc., and their related information such as locations, current vacancy status, parking lot capacity and availability of parking or booking.

Also, when the particular service information is selected for accessing, the display of the objects, to be accessed, displayed over the monitor section 28 is terminated. Though not specifically shown in the drawings, further, when the objects, to be accessed, are displayed over the monitor section 28 for more than a given time period, then the display of the objects is also terminated.

In step S104, the radio communication unit 20 checks whether the selected service information is received or not yet received. If the desired information is found not to be received, then, the step S104 is repeated for each certain time interval.

When the demanded service information is received, in step S105, the radio communication unit 20 sends the received service information to the memory section 30, which in turns stores the received service information and delivers an output signal, representing that the received service information has been stored, to the display light control section 32.

In step S106, the display light control section 32 turns on the light emitting section 34 for a first predetermined time interval of, for example, one second.

In step S107, the display light control section 32 checks whether a second predetermined time interval has passed after the light emitting section 34 has turned on in the previous step. The second predetermined time interval is preferably determined to be, for example, about two seconds such that the second predetermined time interval is expired after the light emitting section 34 has been turned off. The step S107 is repeatedly operated until the second predetermined time interval has elapsed.

When the second predetermined time interval has elapsed, in step S108, the display light control section 32 retrieves the selected service information, stored in the memory section 30, and allow the retrieved service information to be displayed over the monitor section 28.

With such structure of the information providing system 10 of the present embodiment, as well as the method for providing information to the vehicle, it is possible for the driver to request desired information by selecting arbitrary service information at any time with the operation of the information request section 22.

An important advantage of the present embodiment concerns the light emitting section 34 which is firstly turned on upon receipt of the demanded service information, and the monitor section 28 which is operated to display the received service information subsequent to the turning-on operation of the light emitting section 34. In effect, the driver's attention is conducted with the lightening of the pair of arrays of the LEDs 34a, 34b located at the left and right pillars 38, 40 toward the vehicular frontal visible range to enable confirmation of a circumferential situation in a front direction of the vehicle, thereby permitting the driver to direct his eyes over the monitor section 28 to read out the selected, desired service information in a safety fashion.

Another important advantage of the present embodiment concerns the display light control section 32 which allows the selected service information to be displayed over the monitor section 28 at a suitable timing after the second predetermined time interval has elapsed without causing any overlooking during the driver's confirmation of the frontal circumferential situation of the vehicle, thereby facilitating the driver's recognition of the received information.

Also, in the present embodiment, the information providing system has been shown and described with reference to cases where, after the elapse of the second predetermined time interval from the turning-on state of the light emitting section 34, the received information is displayed over the monitor section 28, the information providing system may be further provided with an information provision delay command section 70 (shown in FIG. 1) arranged to output a delay command signal responsive to the driver's operation such that upon receipt of the delay command signal delivered from the information provision delay command section 70, the light emitting section 34 is turned on again after a third predetermined time interval of, for example, about three to five seconds, starting from the initial turning-on of the light emitting section 34, which is longer than the second predetermined time interval and subsequently after the second predetermined time interval has elapsed from the expiration of the third predetermined time interval, the received service information is displayed over the monitor section 28 in a repeated manner each time the information provision delay command section 70 is operated.

With such a modification, although when the requested service information is received, the received information is automatically displayed over the monitor section 28 after the elapse of the given time interval starting from the turning-on of the light emitting section 34 provided that no particular operation is taken, it is possible for the driver to operate the information provision delay command section when he is unable to look at the monitor section 28 for a while for thereby confirming the requested service information in a sufficiently extended time period.

(Second Embodiment)

Figure 4:
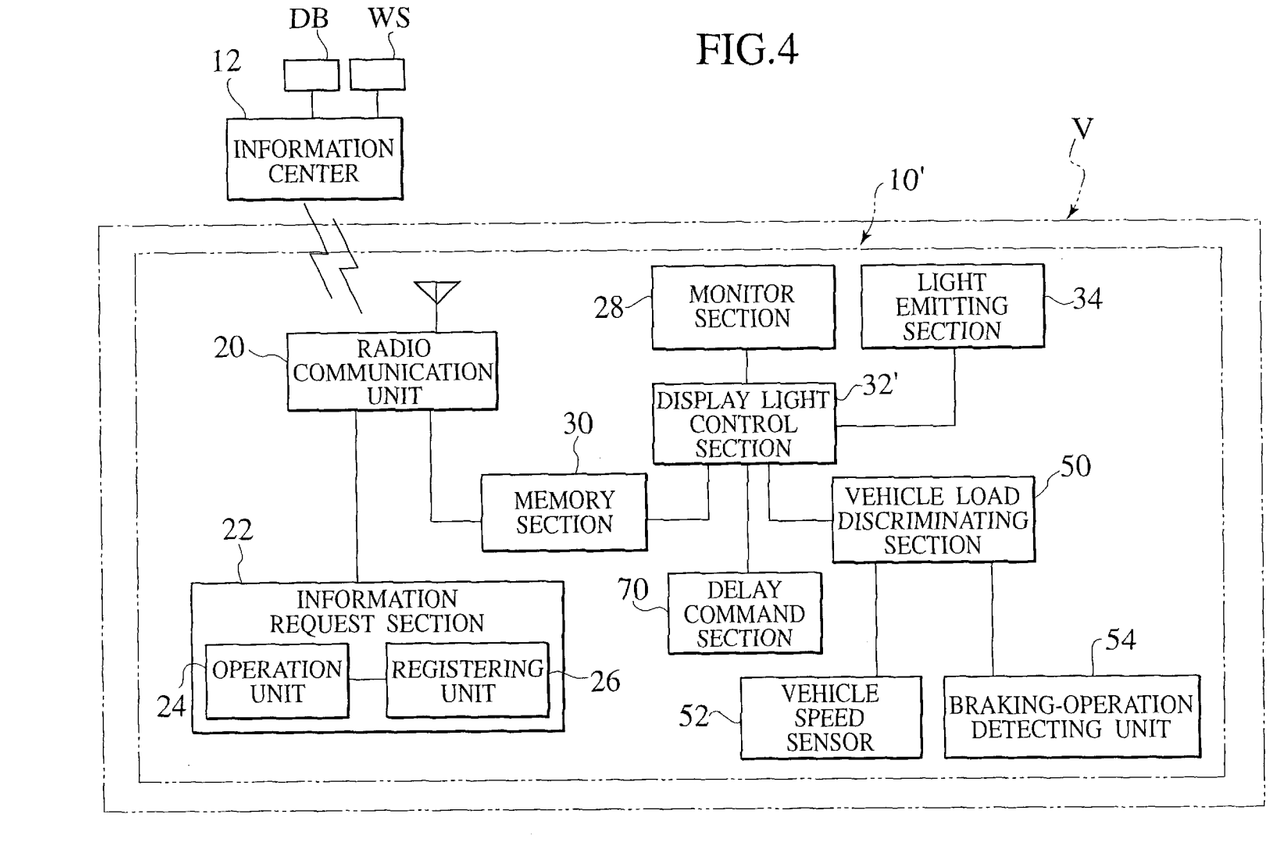
FIG. 4 is a block diagram of an information providing system of a second embodiment according to the present invention.

FIG. 4 shows an information providing system of a second embodiment of the present invention, with a detailed description of the previously described component parts with reference to FIG. 1 being omitted for the sake of simplicity. The second embodiment differs from the first embodiment in that an information providing system 10' newly incorporates a vehicle load discriminating section 50.

In FIG. 4, a display light control section 32' is connected to the vehicle load discriminating section 50, which in turn is connected to a vehicle speed sensor 52, which detects the traveling speed of the vehicle to produce a vehicle speed signal, and a braking-operation detecting unit 54, which detects a braked situation of a parking brake (not shown). The vehicle load discriminating section 50 discriminates a vehicle's halt condition when the vehicle speed remains at zero value and the parking brake remains in its operative condition.

When the display light control section 32' receives the signal, representing that the received service information has been stored, from the memory section 30, the vehicle load discriminating section 50 is responsive to a signal representative of the vehicle's halt condition for allowing the received service information to be immediately displayed over the monitor section 28 without turning on the light emitting section 34. When, in contrast, the discriminated result of the vehicle load discriminating section 50 is out of the vehicle's halt condition, the display light control section 32' is operative first to allow the light emitting section 34 to be turned on as in the first embodiment and subsequently to allow the received service information to be displayed over the monitor section 28.

Figure 5:
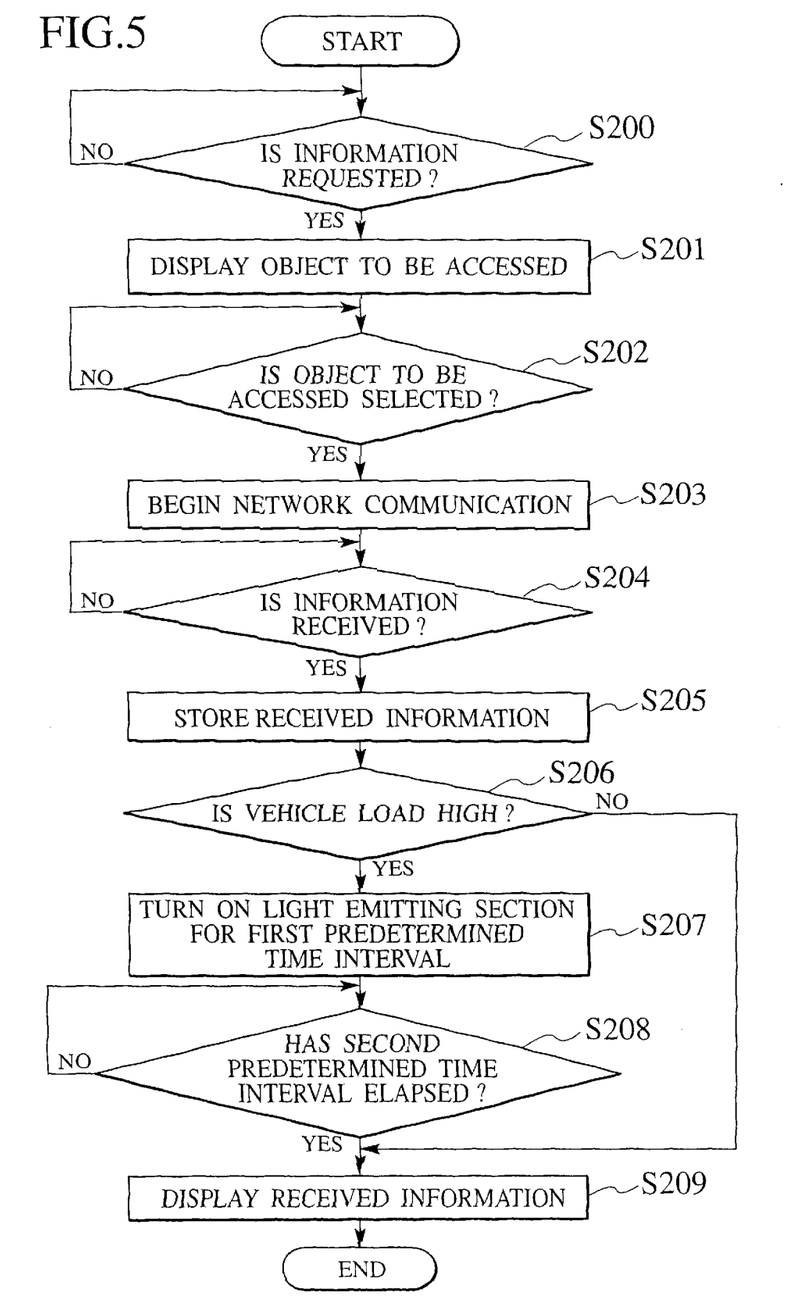
FIG. 5 is a flow diagram of a sequence of operational steps for the information providing system shown in FIG. 4 to carry out a method of the present invention.

FIG. 5 is a flow diagram of the basic sequence of operational steps to be performed by the information providing system 10' shown in FIG. 4 to carrying out a method of the present invention.

In FIG. 5, steps S200 to S205 perform the same operations as steps S100 to S105 of the first embodiment shown in FIG. 3.

Upon receiving the signal representing that the received service information has been stored in the memory section 30, in step S206, the display light control section 32' responds to the signal from the vehicle load discriminating section 50 to check whether a current vehicle's load remains at a high level.

If the discriminated result of the vehicle load discriminating section 50 remains in the vehicle's halt condition, i.e., when the vehicle load discriminating section 50 discriminates that the vehicle load is low, the operation goes to step S209, thereby allowing the received service information to be displayed over the monitor section 28.

That is, such an operation corresponds to a case wherein both the first and second predetermined time intervals are rendered to have a zero value.

When, in contrast, the discriminated result of the vehicle load discriminating section 50 does not remain in the vehicle's halt condition, i.e., when the vehicle load remains in a heavy level, the operation goes to step S207, thereby allowing the light emitting section 34 to be turned on only for the first predetermined time interval. Further, in step S208, it is checked whether the second predetermined time interval has elapsed from the turning on timing of the light emitting section 34 and, if so, the operation goes to step S209. The stream in the operational steps S207 to 209 is the same as those S106 to 108 of the first embodiment discussed above.

With such a structure in the second embodiment, the information providing system 10' has the same advantages as those obtained in the first embodiment. Another important advantage of the second embodiment concerns the provision of the vehicle load discriminating section 50 which causes the display light control section 32' to allow the light emitting section 34 to be turned on to immediately display the received service information over the monitor section 28, without turning on the light emitting section 34, when the vehicle remains in the light load condition for thereby enabling the driver to timely confirm the received service information according to the driving status of the vehicle.

Also, in the present embodiment, too, the information providing system has been shown and described with reference to cases where, after the elapse of the second predetermined time interval from the turning-on state of the light emitting section 34, the received information is displayed over the monitor section 28, the information providing system may be further provided with an information provision delay command section 70 (shown in FIG. 4) arranged to output a delay command signal responsive to the driver's operation such that upon receipt of the delay command signal delivered from the information provision delay command section 70, the light emitting section 34 is turned on again after a third predetermined time interval of, for example, about three to five seconds, starting from the initial turning-on of the light emitting section 34, which is longer than the second predetermined time interval and subsequently after the second predetermined time interval has elapsed from the expiration of the third predetermined time interval, the received service information is displayed over the monitor section 28 in a repeated manner each time the information provision delay command section 70 is operated.

With such a modification also, although when the requested service information is received, the received information is automatically displayed over the monitor section 28 after the elapse of the given time interval starting from the turning-on of the light emitting section 34 provided that no particular operation is taken, it is possible for the driver to operate the information provision delay command section when he is unable to look at the monitor section 28 for a while for thereby confirming the requested service information in a sufficiently extended time period.

(Third Embodiment)

Figure 6:
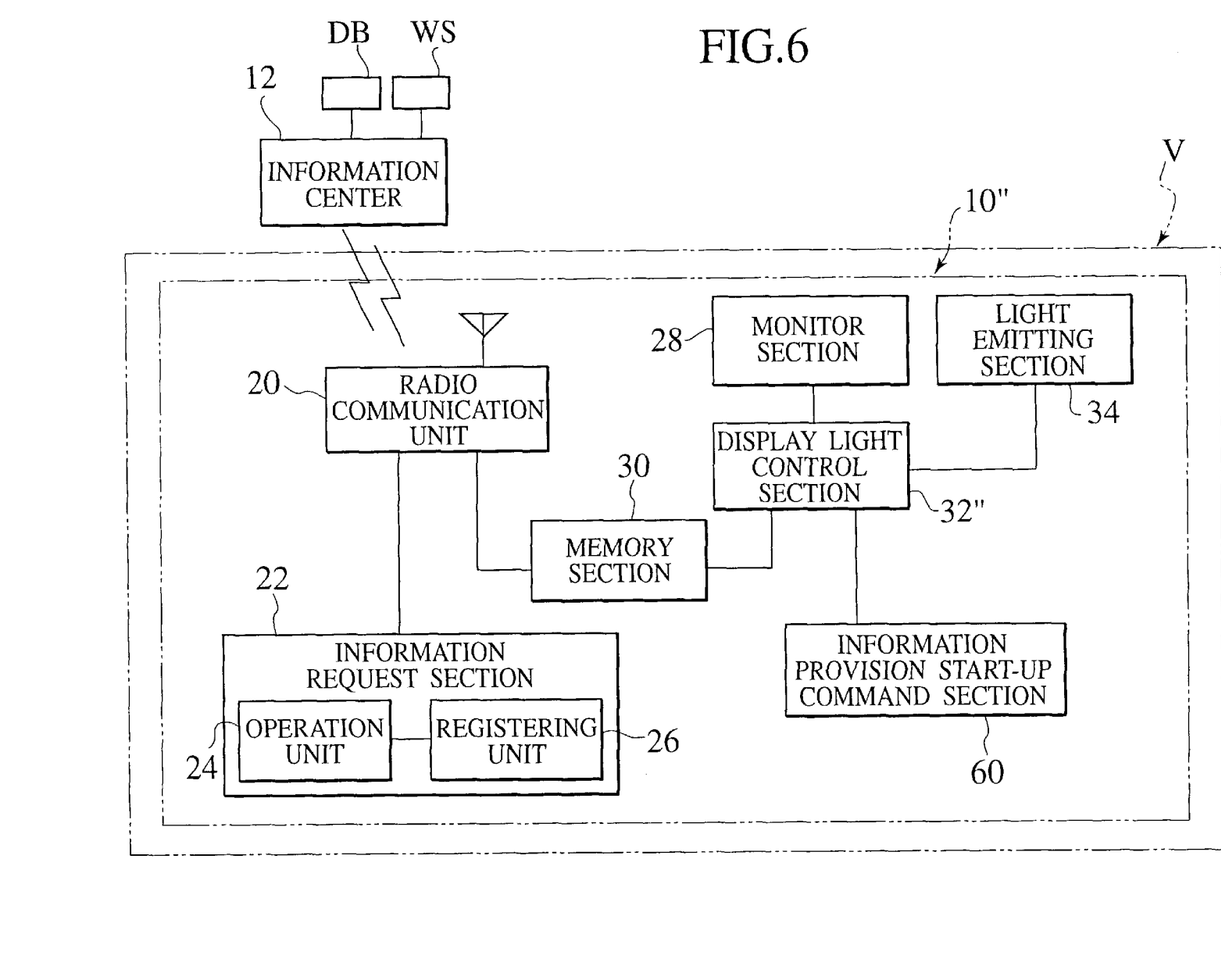
FIG. 6 is a block diagram of an information providing system of a third embodiment according to the present invention.

FIG. 6 shows an information providing system of a third embodiment of the present invention, with a detailed description of the previously described component parts with reference to FIG. 1 being omitted for the sake of simplicity. The third embodiment differs from the first embodiment in that an information providing system 10" newly incorporates an information provision start-up command section 60 which is arranged to be operated by the driver.

More particularly, in the third embodiment of FIG. 6, a display light control section 32" is connected to the information provision start-up command section 60. The display light control section 32" responds to the signal, representing that the received service information has been stored in the memory section 30, delivered from the memory section 30, thereby turning on the light emitting section 34 for the first predetermined time interval in the same manner as previously described above. In this instance, if the driver operates the information provision start-up command section 60, the information provision start-up command section 60 generates an information provision start-up command signal. Upon receipt of this command signal from the information provision start-up command section 60, the display light control section 32" retrieves the stored information from the memory section 30 to display the same over the monitor section 28.

Figure 7:
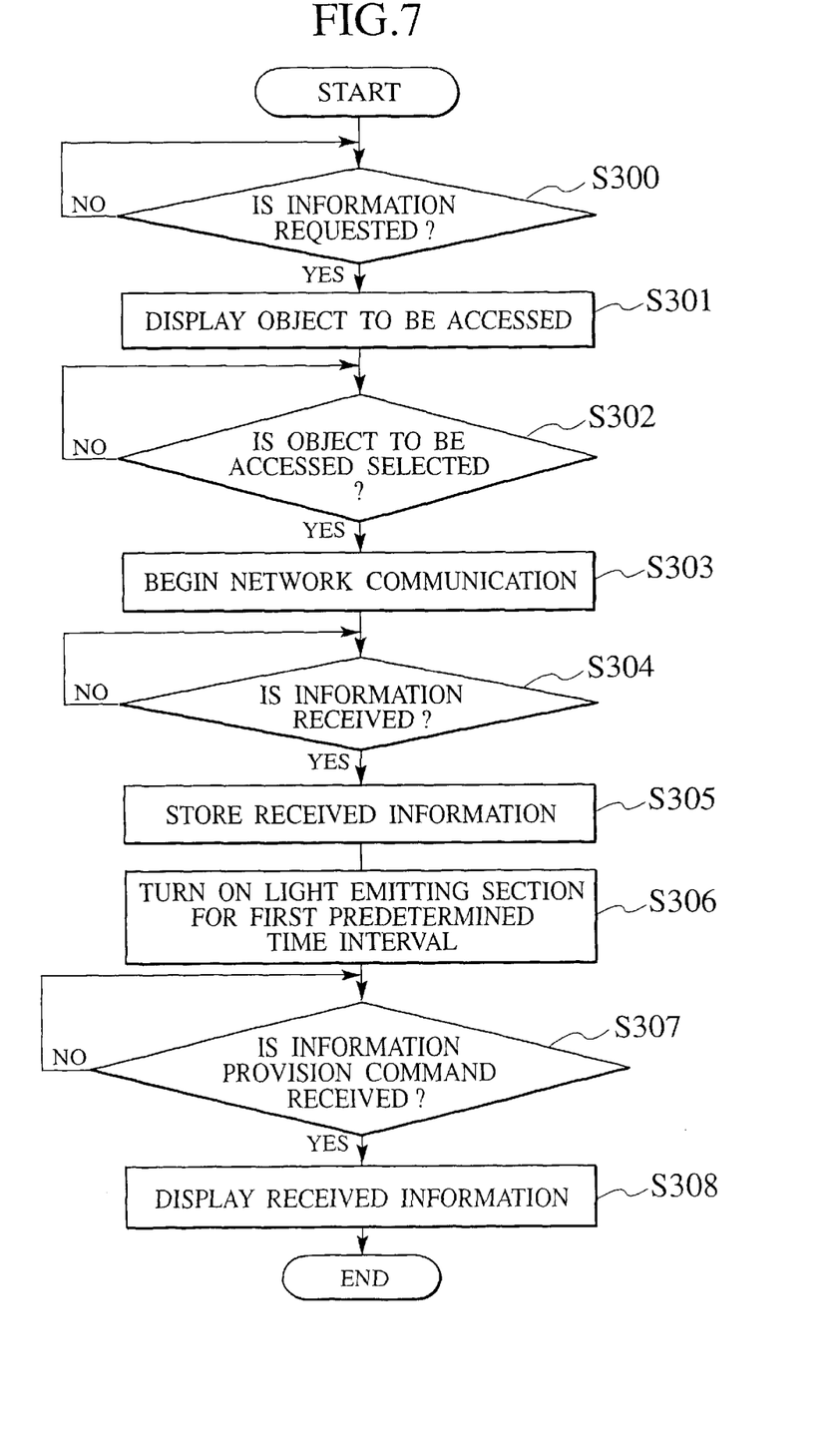
FIG. 7 is a flow diagram of a sequence of operational steps for the information providing system shown in FIG. 6 to carry out a method of the present invention.

FIG. 7 is a flow diagram of the basic sequence of operational steps to be performed by the information providing system 10" shown in FIG. 6 to carry out a method of the present invention.

In FIG. 7, steps S300 to S306 perform the same operations as the steps S100 to S106 of the first embodiment shown in FIG. 3.

In step S307, the display light control section 32" checks whether it receives the information provision start-up command, i.e., the information provision start-up signal from the information provision start-up command section 60. The display light control section 32" repeats the step S307 until it receives the provision start-up signal.

Upon receipt of the provision start-up signal, the operation goes to step S308 such that the display light control section 32" retrieves the stored information from the memory section 30 to display the same over the monitor section 28.

With such an arrangement in the third embodiment of FIG. 6, the light emitting section 34 is first turned on when the requested service information is received in the memory section 30 and subsequently after the driver operates the information provision start-up command section 60, the received information is displayed over the monitor section 28. In effect, attention is called for the driver with the lighting on state of the light emitting section 34 toward the frontal area of the vehicle to permit the driver to confirm the circumferential situation of the vehicle, thereby confirming the received service information at an arbitrary timing with his willing in an adequate time interval.

While, in the embodiments discussed above, the present invention has been shown and described in conjunction with an example wherein, when the received information is stored in the memory section 30, the display light control section functions to turn on the light emitting section 34 for the predetermined time interval, the display light control section may be modified so as to periodically flash the light emitting section 34 on and off at a predetermined frequency.

While, further, the light emitting section 34 has been shown and described as including the two rows of LEDs 34*a*, 34*b* which are mounted to the inner wall of the front left and right pillars 38, 40 of the front window 42, the present invention is not limited thereto and the light emitting section 34 may be constructed of a row of LEDs mounted to an inner wall of a roof panel along a frontal, upper edge thereof or a row of LEDs mounted to an edge portion of the instrument panel along an area in the vicinity of a lower edge of the front window such that the light emitting section 34 surely calls for the driver's attention toward the frontal area through the front window 42.

In addition, the light emitting section 34 may not be limited to a particular structure of the row of the LEDs arranged in a surface configuration, but may be composed of other light emitting elements, such as EL device (electroluminescence device) or fluorescence light tube, formed in the surface configuration or in the array configuration, or a light conductive and light diffusive type optical member such as a light guide.

Also, the light emitting section 34 may be composed of a light emitting element such as a transparent EL device (electroluminescence device) which does not disturb the visibility during the non-turning on state.

Furthermore, the light emitting section 34 may be arranged to be turned on for a given time interval or to be flashed on and off even when the communication is established between the information center 12 and the radio communication unit 20 by selecting the particular service information with the information request section 22 to request the same.

Also, in the embodiments discussed above, while the information providing system has been shown and described as including the information request section 22 arranged to have a capability of selecting the object to be accessed to request an arbitrary service information, the radio communication unit 20 may be preset such that the desired service information is periodically requested. With such presetting operation, it is possible for the driver to regularly obtain the desired information without operating the information request section 22 each time the driver needs the desired information.

In addition, although the display light control sections 32, 32', 32" have been shown and described as being responsive to the signal, which represents that the memory section 30 has stored the received service information, for controlling the light emitting section 34, the information providing system may be modified such that the display light control section receives a signal, which represents that the requested service information has been received, directly from the radio communication unit 20 to perform the control of the display light control section or the like.

Further, in the illustrated embodiments discussed above, the information providing system of the present invention has been shown and described with reference to the example wherein the received service information is visually displayed over the monitor section 28, the present invention is not limited thereto and the received service information is provided with voice information. Even in such a modification, it is possible for the light emitting section 34 to be turned on to call the driver's attention toward the frontal area of the vehicle to enable the driver first to confirm the circumferential situation and subsequently to listen to voice information with a sense of security.

The entire content of a Patent Application No. TOKUGAN 2000-334994 with a filing date of Nov. 1, 2000 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An information providing system of a vehicle providing information from an outside section to the vehicle, comprising:
   a communication section making a request to the outside section for transmitting a pre-selected service information and receiving the requested service information from the outside section;
   a memory section storing the requested service information received from the outside section;
   an information providing section providing the received information stored in the memory section;
   a light emitting section located in a frontal visible area of the vehicle; and
   a control section controlling the light emitting section to turn on for a first time interval when the requested service information is stored in the memory section and controlling the information providing section to provide the stored service information when a second time interval elapses after the light emitting section has been turned on in accordance with the requested service information having been stored in the memory section.

2. An information providing system according to claim 1, wherein the second time interval is defined to be longer than the first time interval.

3. An information providing system according to claim 1, wherein the control section allows the stored service information to be provided on the information providing section after the light emitting device has been turned off.

4. An information providing system according to claim 1, further comprising a vehicle load discriminating section discriminating a vehicle's load status, and wherein the second time interval is determined to correspond to the vehicle's load status.

5. An information providing system according to claim 4, wherein, when the vehicle's load status remains at a low level, the control section allows the stored service information to be provided on the information providing section without turning on the light emitting section.

6. An information providing system according to claim 1, further comprising an information provision start-up command section producing a start-up command signal responsive to a driver's operation, and wherein the second time interval is defined to correspond to reception of the start-up command signal.

7. An information providing system according to claim 6, wherein, when the start-up command signal is received from the information provision start-up command section after the light emitting section has been turned on, the control section allows the stored service information to be provided on the information providing section.

8. An information providing system according to claim 1, wherein the light emitting section is mounted in the vicinity of a circumferential portion of a front window of the vehicle.

9. An information providing system according to claim 1, further comprising an information provision delay command section producing a delay command signal responsive to a driver's operation, and wherein, when the delay command signal is received from the information provision delay command section after the light emitting section has been turned on, the control section allows the stored service information to be provided on the information providing section after elapse of a third time interval longer than the second time interval.

10. An information providing system according to claim 1, further comprising an information request section in which an information source to be accessed in correspondence with service information to be selected is selectable so that the communication section makes the request to the outside section for transmitting the pre-selected service information from the information source.

11. An information providing system according to claim 10, wherein the control section allows the light emitting section to be turned on when the communication section transmits the request of the service information selected by the information request section to the outside section.

12. An information providing system of a vehicle providing information from an outside section to the vehicle, comprising:
   communicating means for making a request to the outside section for transmitting a pre-selected service information and receiving the requested service information from the outside section;
   memory means for storing the requested service information received from the outside section;
   information providing means for providing the received information stored in the memory section;
   light emitting means for emitting a light and located in a frontal visible area of the vehicle; and
   controlling means for controlling the light emitting means to turn on for a first time interval when the requested service information is stored in the memory means and controlling the information providing means to provide the stored service information when a second time interval elapses after the light emitting section has been turned on in accordance with the requested service information having been stored in the memory means.

13. A method of providing information from an outside section to a vehicle, comprising:
   requesting a pre-selected service information to the outside section;
   receiving the requested service information from the outside section;
   storing the received service information;
   providing the stored information in the vehicle;
   turning on a light at a frontal visible area of the vehicle; and
   controlling the light to be turned on for a first time interval when the requested service information is stored in the memory section and controlling the stored service information to be provided when a second time interval elapses after the light has been turned on in accordance with the requested service information having been stored in the memory section.

* * * * *